United States Patent
Kanakubo (10) Patent No.: US 8,988,721 B2
(45) Date of Patent: Mar. 24, 2015

(54) PRINTING APPARATUS AND METHOD FOR CONTROLLING A TIMING AT WHICH PRINT DATA AND STATUS INFORMATION COMMUNICATION PORTS ARE OPENED

(71) Applicant: Canon Kabushiki Kaisha, Tokyo (JP)

(72) Inventor: Yukio Kanakubo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/091,065

(22) Filed: Nov. 26, 2013

(65) Prior Publication Data
US 2014/0153028 A1   Jun. 5, 2014

(30) Foreign Application Priority Data
Nov. 30, 2012  (JP) .................................. 2012-263124

(51) Int. Cl.
*G06F 3/12*   (2006.01)
*G06K 15/00*   (2006.01)

(52) U.S. Cl.
CPC .............. *G06K 15/408* (2013.01); *G06F 3/121* (2013.01); *G06F 3/1234* (2013.01); *G06F 3/1236* (2013.01); *G06F 3/1284* (2013.01)
USPC ............. 358/1.15; 358/1.14; 710/100; 710/1; 710/5

(58) Field of Classification Search
None
See application file for complete search history.

(56) References Cited

FOREIGN PATENT DOCUMENTS

JP   2000-238363 A   9/2000

*Primary Examiner* — Paul F Payer
(74) *Attorney, Agent, or Firm* — Canon USA, Inc., IP Division (57) ABSTRACT

A status information communication port for notifying a host apparatus of an error that has occurred during initialization of a printer engine, and a print data communication port for receiving print data sent from the host apparatus are respectively opened at appropriate timings. For example, the status information communication port is opened in response to completion of initialization of an interface, and the print data communication port is opened in response to completion of the initialization of the printer engine.

6 Claims, 8 Drawing Sheets

FIG. 2

PRINTING APPARATUS AND METHOD FOR CONTROLLING A TIMING AT WHICH PRINT DATA AND STATUS INFORMATION COMMUNICATION PORTS ARE OPENED

BACKGROUND OF THE INVENTION

1. Field of the Invention

The present invention relates to a printing apparatus, a method for controlling the printing apparatus, and a storage medium.

2. Description of the Related Art

In recent years, an interface for connecting a printing apparatus and a host apparatus has generally included a universal serial bus (USB) interface (I/F) and a network I/F with an Ethernet cable. The interfaces have been used to not only send print data from the host apparatus to the printing apparatus but also to send status information such as an error, which occurred in the printing apparatus, from the printing apparatus to the host apparatus.

For communication of the print data and the status information, Japanese Patent Application Laid-Open No. 2000-238363 discusses a configuration in which different logical ports are respectively used in communication of print data and communication of status information. The communication of the print data and the communication of the status information do not compete with each other by respectively using the different logical ports so that communication can be efficiently performed between the printing apparatus and the host apparatus. A "logical port" used herein means a port that is physically connected via one communication cable but is logically usable as each of a plurality of communication ports. For example, the USB I/F can have a plurality of endpoints. Each of the endpoints corresponds to the logical port. The network I/F can virtually implement a plurality of communication ports by designating port numbers of a transmission control protocol/Internet protocol (TCP/IP). The communication port corresponds to the logical port.

Figure 1:
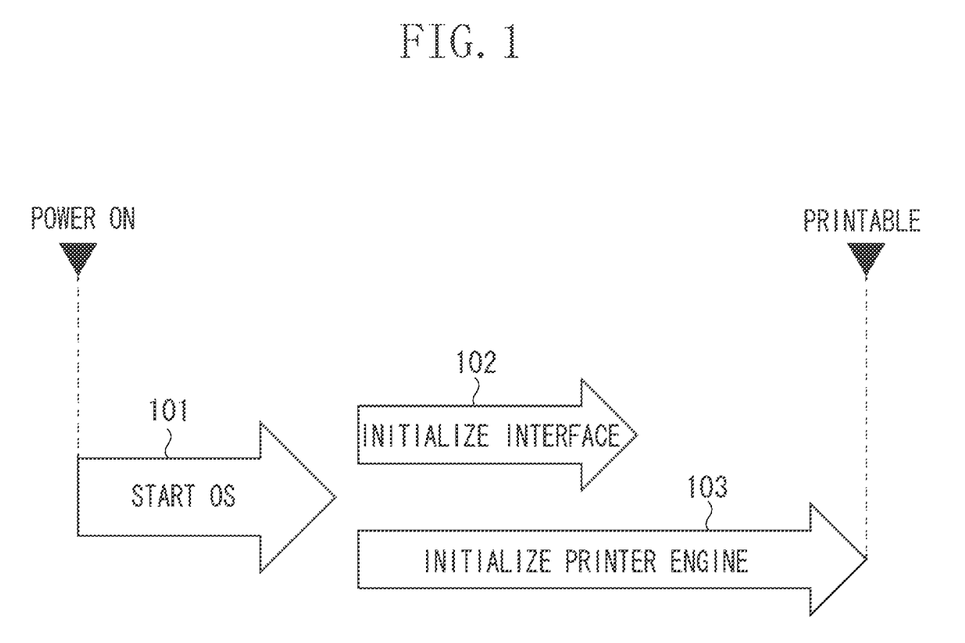
FIG. 1 illustrates initialization processing performed when a printing apparatus is started in a conventional technique.

An initialization sequence during power-on of a general printing apparatus will be described with reference to FIG. 1. When power to the printing apparatus is turned on, an operating system (OS) is first started (101). When the start of the OS (101) has been completed, initialization of an interface (102) and initialization of a printer engine (103) are performed in parallel.

"Initialization of an interface" means bringing the USB I/F or the network I/F into a communicable state. However, communication cannot be immediately performed because the initialization of the interface (102) has been completed. To perform the communication, the communication port needs to be opened. On the other hand, "initialization of a printer engine" means bringing the printer engine into a printable state. More specifically, an operation of each mechanism is checked as to whether a fixing device heater can be temperature-adjusted to a defined temperature and whether a sheet conveyance motor normally operates, for example. When the initialization of the interface (102) and the initialization of the printer engine (103) are compared with each other, it takes more time to initialize the printer engine than to initialize the interface. When both the initialization of the interface (102) and the initialization of the printer engine (103) have been completed, the printing apparatus enters a printable state.

Figure 2:
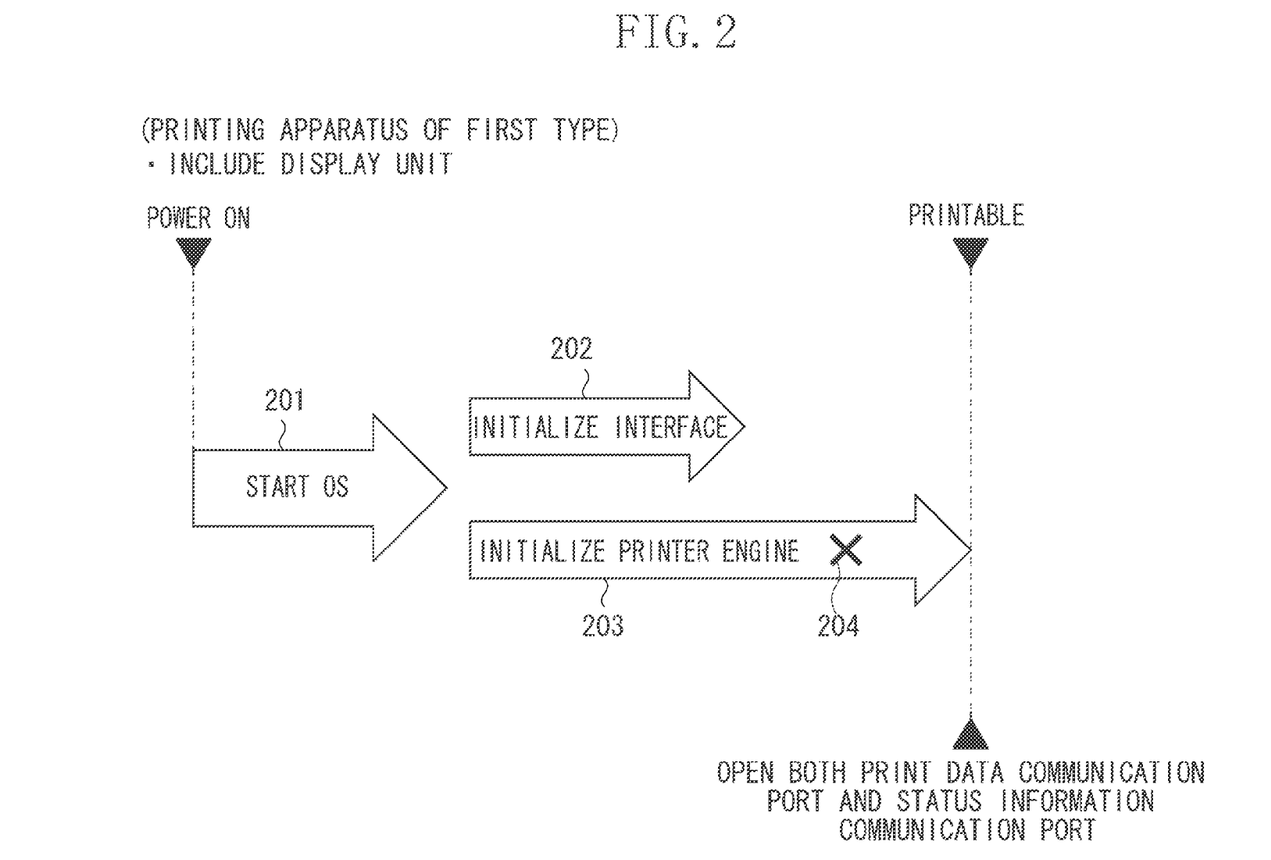
FIG. 2 illustrates initialization processing of a printing apparatus of a first type in a conventional technique.

For the general printing apparatus, timing at which a print data communication port used to communicate the print data is opened and timing at which a status information communication port used to communicate the status information such as the error is opened will be described below. FIG. 2 illustrates a printing apparatus of a first type as the general printing apparatus. The printing apparatus of the first type receives page description language (PDL) data, which has been sent from a host apparatus, and rasterizes the received PDL data into bit map data, to perform printing. The printing apparatus of the first type has a feature of including a display unit such as a liquid crystal display (LCD).

When power to the printing apparatus of the first type is turned on, an OS is first started (201). When the start of the OS (201) has been completed, initialization of an interface (202) and initialization of a printer engine (203) are performed in parallel. In the printing apparatus of the first type, both a print data communication port and a status information communication port are opened at timing at which the initialization of the printer engine (203) has been completed.

In the printing apparatus of the first type, it is assumed that an engine error occurred at timing 204 during the initialization of the printer engine (203). At this time, the status information communication port was not opened. However, a content of the engine error can be displayed on the display unit. Therefore, there is no problem as long as timing at which the status information communication port is opened is the timing at which the initialization of the printer engine (203) has been completed.

If the engine error has occurred, restart accompanied by power-off of the printing apparatus is required after a user performs an operation for eliminating the engine error. When the printing apparatus is restarted, the print data (PDL data and rasterized bit map data), which has already been stored in the printing apparatus, is deleted. Even if the printing apparatus of the first type is restarted, accompanied by the power-off, however, the printing apparatus does not store the print data because timing at which the print data communication port is opened is the timing at which the initialization of the printer engine (203) has been completed. Therefore, for the printing apparatus of the first type, there is no problem as long as the timing at which the print data communication port is opened is the timing at which the initialization of the printer engine (203) has been completed.

Consider a printing apparatus of a second type that differs from the printing apparatus of the first type. The printing apparatus of the second type has a feature of not including a display unit such as a LCD, unlike the printing apparatus of the first type.

Figure 3:
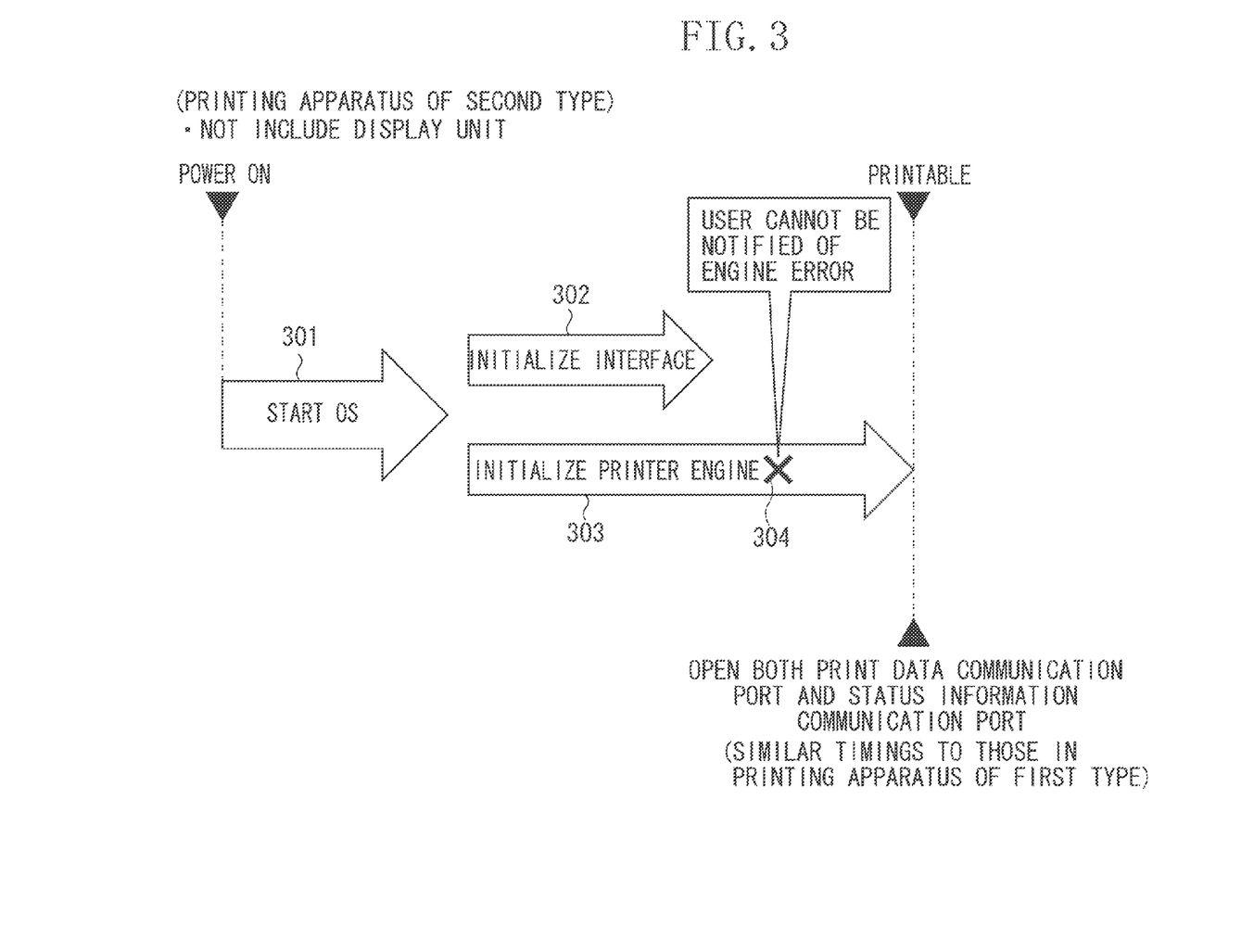
FIG. 3 illustrates an issue in a printing apparatus of a second type.

For the printing apparatus of the second type, an issue occurring when timing at which a print data communication port is opened and timing at which a status information communication port is opened are made similar to those for the printing apparatus of the first type will be described with reference to FIG. 3. When power to the printing apparatus of the second type is turned on, an OS is first started (301). When the start of the OS (301) has been completed, initialization of an interface (302) and initialization of a printer engine (303) are performed in parallel. In FIG. 3, the timing at which the print data communication port is opened and the timing at which the status information communication port is opened are similar to those for the printing apparatus of the first type, and both the print data communication port and the status information communication port are opened at timing at which the initialization of the printer engine (303) has been completed.

When an engine error occurs at timing 304 during the initialization of the printer engine (303), a user needs to be notified of the engine error. However, the printing apparatus of the second type does not include the display unit, and the status information communication port has not been opened. Thus, the user cannot be notified of the engine error.

SUMMARY OF THE INVENTION

The present invention is directed to opening a print data communication port and a status information communication port, respectively, at appropriate timings.

According to an aspect of the present invention, a printing apparatus includes an interface configured to perform communication with an external apparatus, a printing unit configured to perform print processing based on print data received from the external apparatus via the interface, and a control unit configured to perform initialization processing of the interface and determination processing for determining whether the printing unit normally operates when the printing apparatus is started, wherein the control unit opens a first logical port for notifying the external apparatus of status information of the printing apparatus in response to completion of the initialization processing, and opens a second logical port for receiving the print data from the external apparatus in response to the determination by the determination processing that the printing unit normally operates.

Further features and aspects of the present invention will become apparent from the following detailed description of exemplary embodiments with reference to the attached drawings.

DESCRIPTION OF THE EMBODIMENTS

Various exemplary embodiments, features, and aspects of the invention will be described in detail below with reference to the drawings. Exemplary embodiments, described below, do not limit the claimed invention, and all combinations of features described in the exemplary embodiments are not necessarily essential for a solution to the invention.

Figure 4:
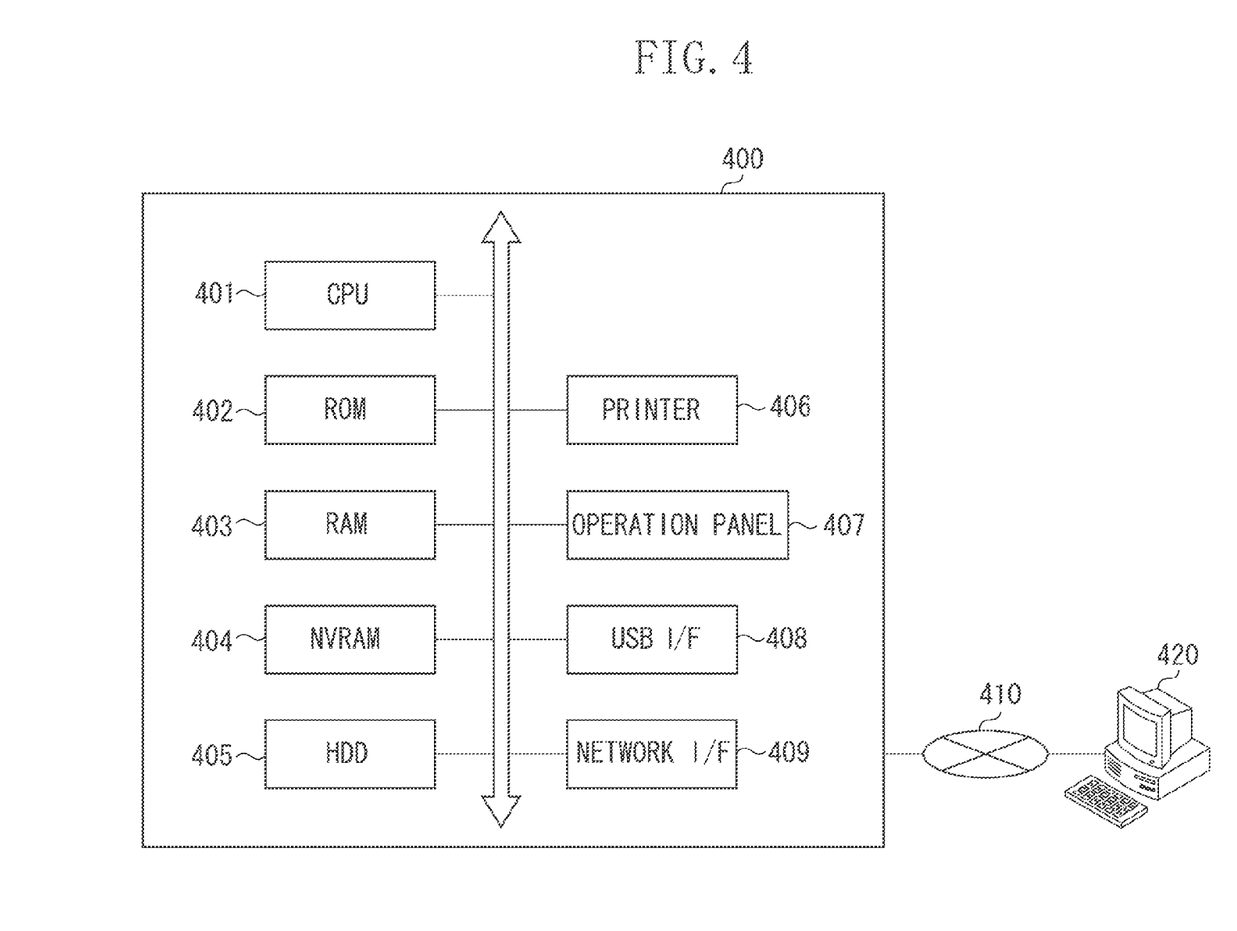
FIG. 4 illustrates a configuration of a printing system.

A printing system according to the present exemplary embodiment will be described with reference to FIG. 4. The printing system according to the present exemplary embodiment includes a printing apparatus 400 and a host apparatus 420. The printing apparatus 400 and the host apparatus 420 are connected to be communicable with each other via a network 410. The printing apparatus 400 receives PDL data that has been sent from the host apparatus 420. The printing apparatus 400 rasterizes the PDL data into bit map data to perform print processing on a sheet or sheets based on the rasterized bit map data.

The host apparatus 420 is a personal computer (PC), for example. The host apparatus 420 sends the PDL data to the printing apparatus 400 as print data. The host apparatus 420 includes a display unit, and can display status information which has been notified from the printing apparatus 400 described below, on the display unit.

A configuration of the printing apparatus 400 will be described below. A central processing unit (CPU) 401 reads out a control program stored in a read-only memory (ROM) 402 to control an operation of the entire printing apparatus 400. A random access memory (RAM) 403 is used as a temporary storage area such as a main memory or a work area of the CPU 401. A nonvolatile RAM (NVRAM) 404 is a nonvolatile memory, and stores various types of information. A hard disk drive (HDD) 405 is used as a storage area for storing font data, an emulation program, and form data.

Figure 6:
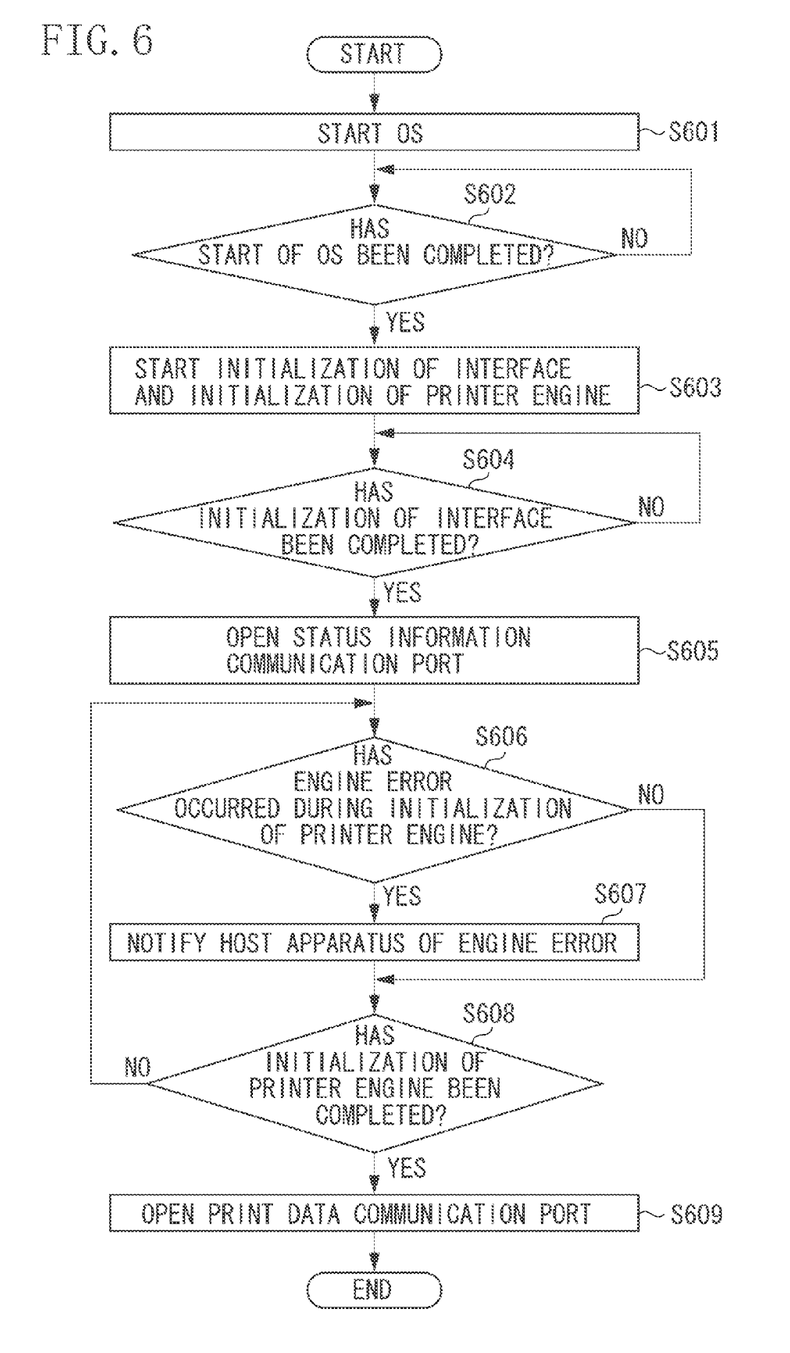
FIG. 6 is a flowchart illustrating the initialization processing of the printing apparatus in the first exemplary embodiment.

While the printing apparatus 400 is configured in a manner that one CPU 401 performs each of processes illustrated in a flowchart of FIG. 6, described below, using one memory (the RAM 403 or the HDD 405), it may be configured in another manner. For example, each of the processes in the flowchart of FIG. 6, described below, can also be performed by making a plurality of CPUs and a plurality of RAMs or HDDs cooperate with one another.

A printer 406 includes a printer engine, and performs print processing on the sheet or sheets based on the PDL data received from the host apparatus 420.

An operation panel 407 includes a switch, an operation key, and a light emitting diode (LED) display for a user to operate the printing apparatus 400.

A network I/F 409 controls communication performed between the printing apparatus 400 and the host apparatus 420. A network cable such as an Ethernet cable or a local area network (LAN) cable is connected to the network I/F 409.

The printing apparatus 400 receives the print data (PDL data) which has been sent from the host apparatus 420 via the network I/F 409, and sends status information such as an error which has occurred in the printing apparatus 400 to the host apparatus 420. Communication of the print data and communication of the status information may compete with each other to be unsuccessful when performed via one communication port. Therefore, in the present exemplary embodiment, the printing apparatus 400 uses different logical ports, respectively, in the communication of the print data and the communication of the status information. The network I/F 409 can virtually implement a plurality of communication ports by designating port numbers of a TCP/IP, and allocates the plurality of communication ports, respectively, to the communication of the print data and the communication of the status information as logical ports.

Communication between the printing apparatus 400 and the host apparatus 420 is not limited to the network I/F 409. The printing apparatus 400 includes a USB I/F 408, and a USB cable is connected to the USB I/F 408. Communication can also be performed between the printing apparatus 400 and the host apparatus 420 via the USB cable. The USB I/F 408 can have a plurality of endpoints, and allocates the endpoints, respectively, to the communication of the print data and the communication of the status information as logical ports. While the printing apparatus 400 communicates with the host apparatus 420 via the network I/F 409 in FIG. 4, the communication may be performed using the USB I/F 408.

The configuration of the printing apparatus 400 has been described above. The printing apparatus 400 does not include a display unit for displaying the status information such as the error that has occurred in the printing apparatus 400. It is assumed that even if the printing apparatus 400 includes a display unit, the status information cannot be displayed in detail because a display area is small, for example. While the printing apparatus 400 may be able to notify the user that any error has occurred using an LED display device or a beep sound, the user cannot be notified of a detailed content of the error using the LED display device or the beep sound. Therefore, the printing apparatus 400 notifies the host apparatus 420 of the status information such as the error which has occurred in the printing apparatus 400 via an interface (the USB I/F 408 or the network I/F 409) to notify the user of the status information. The host apparatus 420, which has received the notification, displays the notified status information on the display unit in the host apparatus 420.

An initialization sequence to be executed when power to the printing apparatus 400 is turned on, i.e., when the printing apparatus 400 is started will be described with reference to FIG. 5. When the power to the printing apparatus 400 is turned on, an OS is first started (501). When the start of the OS (501) has been completed, initialization of an interface (502) and initialization of a printer engine (503) are performed in parallel.

"Initialization of an interface" means bringing the USB I/F 408 or the network I/F 409 into a communicable state. That is, when the initialization of the interface (502) has been completed, the USB I/F 408 or the network I/F 409 enters the communicable state. However, communication cannot be immediately performed because the initialization of the interface (502) has been completed. To perform the communication, the communication port needs to be opened. "Open a communication port" means permitting communication using the communication port or making data sendable/receivable to/from the host apparatus 420.

On the other hand, "initialization of a printer engine" means bringing the printer 406 into a printable state. That is, when the initialization of the printer engine (503) has been completed, the printer 406 enters the printable state. More specifically, an operation of each mechanism is checked as to whether a fixing device heater is temperature-adjustable to a defined temperature and whether a sheet conveyance motor normally operates, for example. When the initialization of the interface (502) and the initialization of the printer engine (503) are compared with each other, it takes more time to initialize the printer engine than time to initialize the interface. When both the initialization of the interface (502) and the initialization of the printer engine (503) have been completed, the printing apparatus 400 enters a printable state.

Timing at which a print data communication port used to communicate the print data is opened and timing at which a status information communication port used to communicate the status information such as the error is opened will be described. The printing apparatus 400 opens the status information communication port when the initialization of the interface (502) has been completed. The printing apparatus 400 opens the print data communication port when the initialization of the printer engine (503) has been completed. An advantage of setting the timing at which the status information communication port is opened and the timing at which the print data communication port is opened, respectively, to timings illustrated in FIG. 5 will be described below.

In the printing apparatus 400, it is assumed that an engine error occurred at timing 504 during the initialization of the printer engine (503). The printing apparatus 400 needs to notify the host apparatus 420 of status information representing the engine error to notify the user of the engine error. In the present exemplary embodiment, the status information communication port is opened in response to the completion of the initialization of the interface (502) without waiting for the completion of the initialization of the printer engine (503). Thus, the host apparatus 420 can be notified of the engine error. If the timing at which the status information communication port is opened is set to timing at which the initialization of the printer engine (503) has been completed, the printing apparatus 400 cannot notify the user of the engine error, as described in FIG. 3.

If the engine error has occurred during the initialization of the printer engine (503), restart accompanied by power-off of the printing apparatus 400 is required after the user performs an operation for eliminating the engine error. The printing apparatus 400 deletes the print data, which has already been stored therein, when restarted accompanied by the power-off. In the present exemplary embodiment, the timing at which the print data communication port is opened is set to the timing at which the initialization of the printer engine (503) has been completed. If the timing at which the print data communication port is opened is set to the timing at which the initialization of the interface (502) has been completed, the printing apparatus 400 may have already stored the print data at the time point of timing 504. In this case, the printing apparatus 400 deletes the print data by being restarted. An attempt of the printing apparatus 400 to acquire the deleted print data again may cause extra time and labor for the user to perform a printing operation again in the host apparatus 420 and send the same print data as the deleted print data to the printing apparatus 400 again, for example. Therefore, in the present exemplary embodiment, the timing at which the print data communication port is opened is set to the timing at which the initialization of the printer engine (503) has been completed so that the print data can be prevented from being received from the host apparatus 420 during the initialization of the printer engine (503).

As described above, the printing apparatus 400 opens the status information communication port when the initialization of the interface (502) has been completed, and opens the print data communication port when the initialization of the printer engine (503) has been completed. Thus, the print data can be prevented from being deleted due to the occurrence of the engine error during the initialization of the printer engine (503) while the user is notified of the engine error that has occurred.

Processing performed by the printing apparatus 400 when the power to the printing apparatus 400 is turned on, i.e., when the printing apparatus 400 is started will be described with reference to a flowchart of FIG. 6. Steps illustrated in the flowchart of FIG. 6 are processed when the CPU 401 rasterizes a program stored in the memory such as the ROM 402 into the RAM 403 and executes the rasterized program.

When the power to the printing apparatus 400 is turned on, the processing proceeds to step S601. In step S601, the CPU 401 starts the OS. In step S602, the CPU 401 determines whether the start of the OS has been completed. If the CPU 401 determines that the start of the OS has been completed (YES in step S602), the processing proceeds to step S603. On the other hand, if the CPU 401 determines that the start of the OS has not been completed (NO in step S602), the CPU 401 waits until the start of the OS is completed.

In step S603, the CPU 401 then starts to initialize the interface and the printer engine. "Initialization of an interface" means bringing the interface provided in the printing apparatus 400, i.e., the USB I/F 408 or the network I/F 409 into a communicable state. On the other hand, "initialization of a printer engine" means bringing the printer 406 into a printable state. While the initialization of the interface and the initialization of the printer engine are performed after the start of the OS has been completed in the present exemplary embodiment, the initialization of the interface and the initialization of the printer engine may be performed without waiting for the completion of the start of the OS.

In step S604, the CPU 401 determines whether the initialization of the interface has been completed. If the CPU 401 determines that the initialization of the interface has been completed (YES in step S604), the processing proceeds to step S605. On the other hand, if the CPU 401 determines that the initialization of the interface has not been completed (NO in step S604), the CPU 401 waits until the initialization of the interface is completed.

In step S605, the CPU 401 opens the status information communication port. If the interface is the USB I/F 408, the CPU 401 opens the status information communication port allocated to one of the plurality of endpoints. If the interface is the network I/F 409, the CPU 401 opens the status information communication port allocated to one of the port numbers of the TCP/IP. The CPU 401 opens the status information communication port in step S605 so that the printing apparatus 400 can notify the host apparatus 420 of an error that has occurred in the printing apparatus 400.

In step S606, the CPU 401 determines whether an engine error has occurred during the initialization of the printer engine. If the CPU 401 determines that the engine error has occurred (YES in step S606), the processing proceeds to step S607. On the other hand, if the CPU 401 determines that the engine error has not occurred (NO in step S606), the processing proceeds to step S608. The example in which the engine error has occurred after the initialization of the interface has been completed has been described in FIG. 5. Even if the engine error has occurred before the initialization of the interface is completed, however, the CPU 401 can detect that the error has occurred in the process in step S606.

In step S607, the CPU 401 notifies the host apparatus 420 of the engine error during the initialization of the printer engine. In the present exemplary embodiment, the CPU 401 notifies the host apparatus 420, which is connected via the USB I/F 408 or the network I/F 409, of the engine error using the status information communication port that has been opened in step S605. The host apparatus 420, which has been notified of the engine error, displays a content of the engine error on the display unit in the host apparatus 420. The user can find out the engine error, which has occurred during the initialization of the printer engine in the printing apparatus 400, by checking the displayed content of the engine error.

In step S608, the CPU 401 determines whether the initialization of the printer engine has been completed. If the CPU 401 determines that the initialization of the printer engine has been completed (YES in step S608), the processing proceeds to step S609. On the other hand, if the CPU 401 determines that the initialization of the printer engine has not been completed (NO in step S608), the processing returns to step S606.

In step S609, the CPU 401 opens the print data communication port. If the interface is the USB I/F 408, the CPU 401 opens the print data communication port allocated to one of the plurality of endpoints. If the interface is the network I/F 409, the CPU 401 opens the print data communication port allocated to one of the port numbers of the TCP/IP. The CPU 401 opens the print data communication port in step S609 so that the printing apparatus 400 can receive the print data that has been sent from the host apparatus 420.

As described above, in the present exemplary embodiment, the timing at which the status information communication port is opened is set to the timing at which the initialization of the interface has been completed. Thus, the host apparatus 420 can be notified of the engine error that has occurred during the initialization of the printer engine. In the present exemplary embodiment, the timing at which the print data communication port is opened is set to the timing at which the initialization of the printer engine has been completed. Thus, the print data can be prevented from being received from the host apparatus 420 while the printer engine is initialized, i.e., while the error in the printer engine may occur.

While the network I/F 409 and the USB I/F 408 have been described as examples of the interface in the present exemplary embodiment, another interface may be used to perform communication between the printing apparatus 400 and the host apparatus 420. For example, a wireless LAN may be used to perform communication between the printing apparatus 400 and the host apparatus 420. If the wireless LAN is used, respective timings at which the status information communication port and the print data communication port are opened may also be set to the timings described in FIG. 5 by allocating the status information communication port and the print data communication port, respectively, to the different logical ports.

Figure 5:
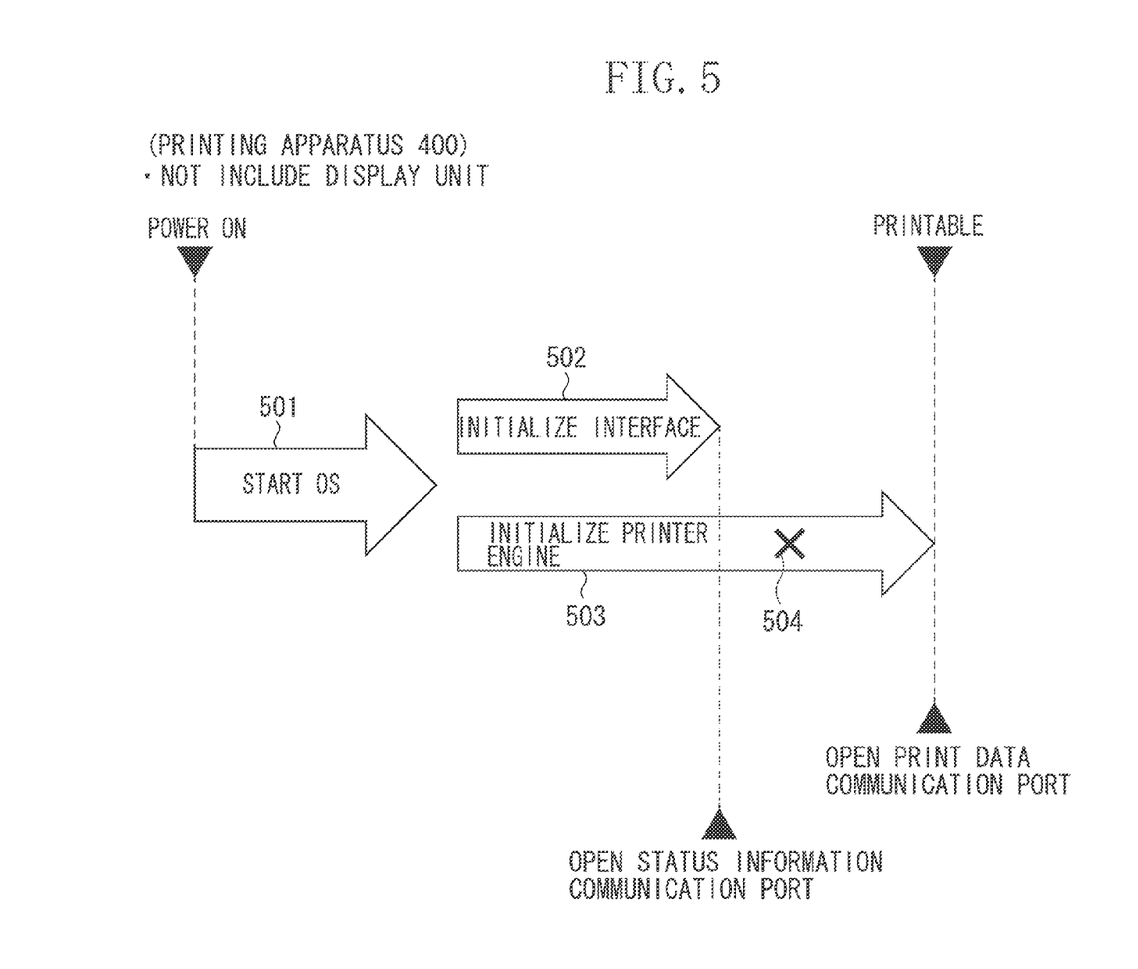
FIG. 5 illustrates initialization processing of a printing apparatus in a first exemplary embodiment.
Figure 7A:
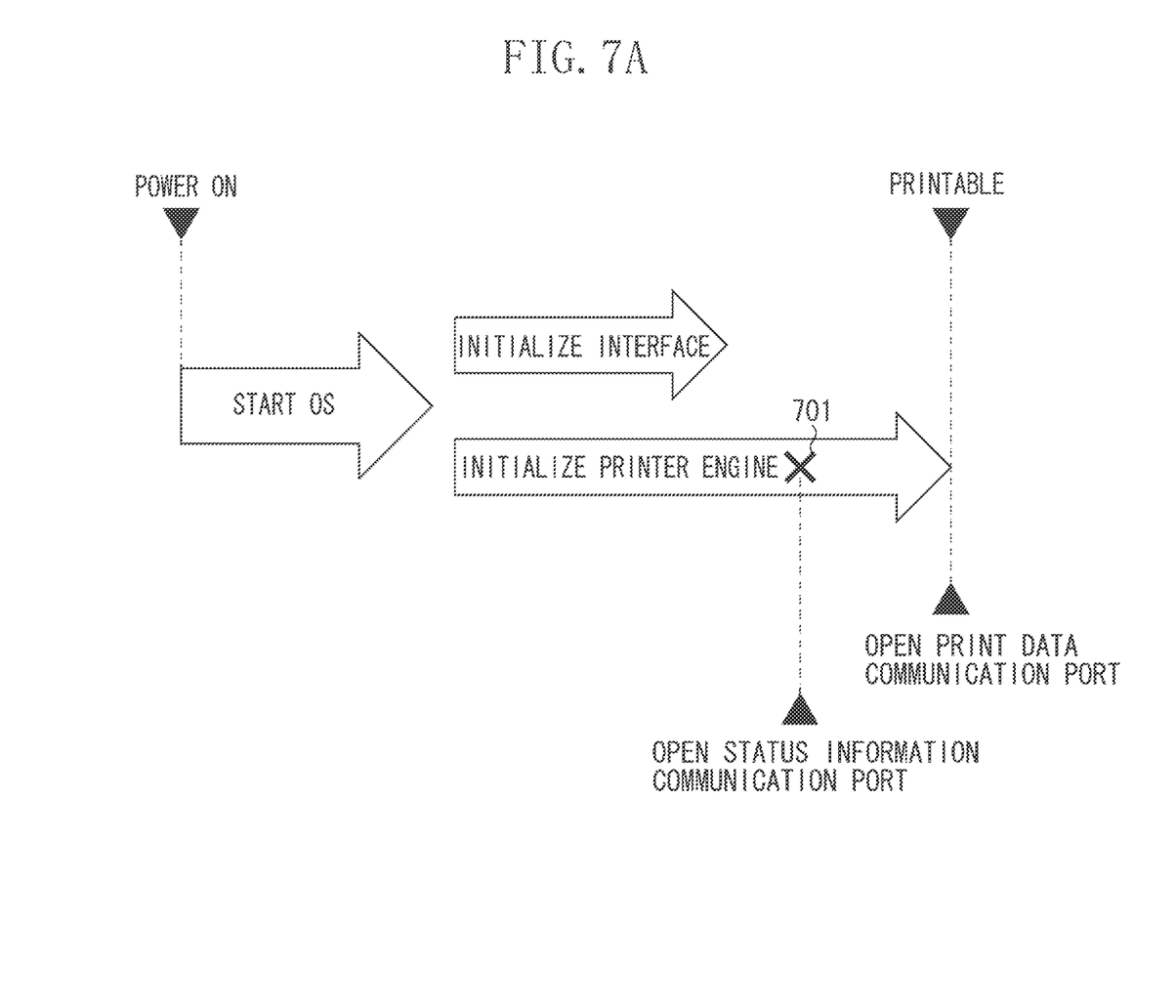
FIGS. 7A and 7B illustrate initialization processing of a printing apparatus in a second exemplary embodiment.
Figure 7B:
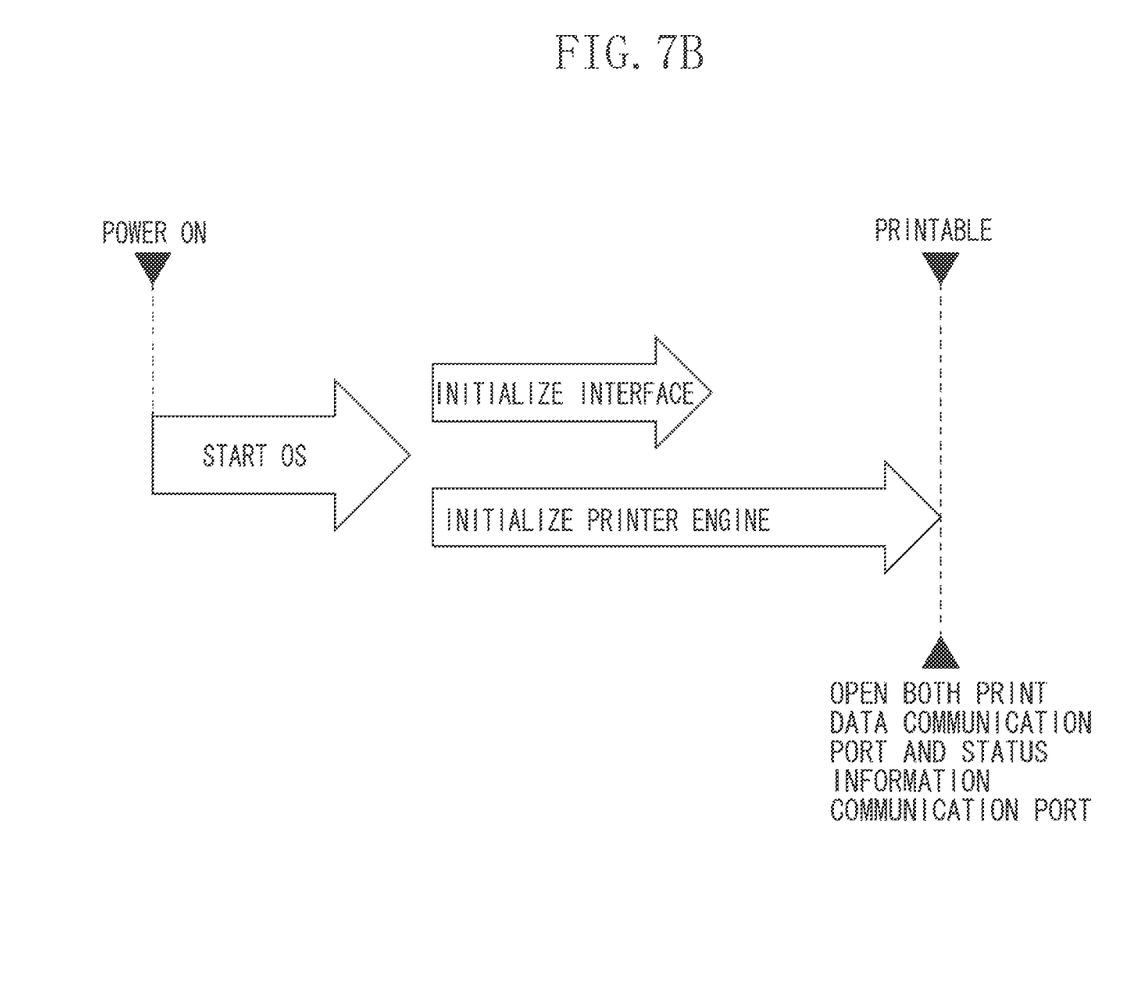

In the first exemplary embodiment, the configuration in which the status information communication port is opened in response to the completion of the initialization of the interface, as described in FIG. 5. On the other hand, in a second exemplary embodiment, a modified example of the first exemplary embodiment will be described with reference to FIG. 7.

In the present exemplary embodiment, the CPU 401 does not open the status information communication port in response to completion of initialization of an interface but opens the status information communication port when it detects that an engine error has occurred during initialization of the printer engine. In FIG. 7A, an engine error occurs at timing 701, and the CPU 401 opens the status information communication port in response to the detection of the engine error. The CPU 401 notifies a host apparatus 420 of the engine error using the status information communication port.

If the engine error has not occurred during the initialization of the printer engine, the CPU 401 opens both the print data communication port and the status information communication port in response to completion of the initialization of the printer engine, as illustrated in FIG. 7B.

According to the present exemplary embodiment, the status information communication port is opened in response to the detection of the engine error. Thus, the host apparatus 420 can be notified of the engine error, like in the first exemplary embodiment. In the present exemplary embodiment, timing at which the print data communication port is opened is set to timing at which the initialization of the printer engine has been completed. Thus, print data can be prevented from being received from the host apparatus 420 while the printer engine is initialized, i.e., while the error in the printer engine may occur, like in the first exemplary embodiment.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures, and functions.

This application claims the benefit of Japanese Patent Application No. 2012-263124 filed Nov. 30, 2012, which is hereby incorporated by reference herein in its entirety.

What is claimed is:

1. A printing apparatus comprising:
   an interface configured to perform communication with an external apparatus;
   a printing unit configured to perform print processing based on print data received from the external apparatus via the interface; and
   a control unit configured to perform initialization processing of the interface and determination processing for determining whether the printing unit normally operates when the printing apparatus is started,
   wherein the control unit opens a first logical port for notifying the external apparatus of status information of the printing apparatus in response to completion of the initialization processing, and opens a second logical port for receiving the print data from the external apparatus in response to the determination by the determination processing that the printing unit normally operates.

2. The printing apparatus according to claim 1, wherein the control unit notifies, when an error in the printing unit has been detected in the determination processing, the external apparatus of status information representing the error using the first logical port.

3. The printing apparatus according to claim 1, wherein the interface is a network interface, and the first logical port and the second logical port are respectively allocated to port numbers of a transmission control protocol/Internet protocol.

4. The printing apparatus according to claim 1, wherein the interface is a universal serial bus interface, and the first logical port and the second logical port are respectively allocated to endpoints of the universal serial bus interface.

5. A method for controlling a printing apparatus including an interface configured to perform communication with an external apparatus and a printing unit configured to perform print processing based on print data received from the external apparatus via the interface, the method comprising:
   performing initialization processing of the interface and determination processing for determining whether the printing unit normally operates when the printing apparatus is started;
   opening a first logical port for notifying the external apparatus of status information of the printing apparatus in response to completion of the initialization processing; and
   opening a second logical port for receiving the print data from the external apparatus in response to the determination by the determination processing that the printing unit normally operates.

6. A non-transitory computer-readable storage medium storing a program for causing a computer to perform the control method according to claim 5.

* * * * *